United States Patent
Du Prez et al.

(10) Patent No.: US 6,242,555 B1
(45) Date of Patent: Jun. 5, 2001

(54) LIGHT-STABLE ELASTOMERIC POLYURETHANE MOULDINGS AND PROCESS FOR THE PRODUCTION THEREOF

(75) Inventors: Eddie Du Prez, Brakel; Pierre Coppens, Heusden, both of (BE)

(73) Assignee: Recticel, Brussels (BE)

( * ) Notice: Subject to any disclaimer, the term of this patent is extended or adjusted under 35 U.S.C. 154(b) by 0 days.

(21) Appl. No.: 09/068,516

(22) PCT Filed: Oct. 1, 1997

(86) PCT No.: PCT/BE97/00112

§ 371 Date: May 13, 1998

§ 102(e) Date: May 13, 1998

(87) PCT Pub. No.: WO98/14492

PCT Pub. Date: Apr. 9, 1998

(30) Foreign Application Priority Data

Oct. 1, 1996 (EP) .................................................. 96202738

(51) Int. Cl.[7] .................................................. C08G 18/75
(52) U.S. Cl. .................................. 528/52; 528/56; 528/58; 528/60; 528/76; 528/77; 524/710; 524/718; 524/720; 524/739; 524/741; 521/108; 521/117; 521/128; 521/127; 521/126; 521/124; 521/161; 521/159
(58) Field of Search .................................. 528/52, 56, 58, 528/60, 76, 77; 524/710, 718, 726, 739, 741; 521/108, 117, 128, 127, 126, 124, 161, 159

(56) References Cited

U.S. PATENT DOCUMENTS

| | | | |
|---|---|---|---|
| 3,931,381 | * 1/1976 | Lindberg | 264/233 |
| 4,452,924 | * 6/1984 | Radovich | 521/133 |
| 5,100,997 | * 3/1992 | Reisch et al. | 528/60 |
| 5,656,677 | * 8/1997 | Jaurquin et al. | 521/126 |
| 5,770,674 | * 6/1998 | Cageao et al. | 528/73 |

FOREIGN PATENT DOCUMENTS

| | | | |
|---|---|---|---|
| 0 017 804 | 10/1980 | (EP) | C08G/18/38 |
| 0 275 010 | 7/1988 | (EP) | C08G/18/79 |
| 0 659 792 | 6/1995 | (EP) | C08G/18/79 |
| 2 450 847 | 10/1980 | (FR) | C08G/18/22 |

OTHER PUBLICATIONS

International Search Report for PCT/BE97/00112; Jan., 1998.

* cited by examiner

*Primary Examiner*—Rachel Gorr
(74) *Attorney, Agent, or Firm*—Sughrue, Mion, Zinn, Macpeak & Seas, PLLC

(57) ABSTRACT

A process for the production of micro-cellular or non-cellular, light-stable elastomeric, flexible or semi-flexible polyurethane moldings which are especially suited for window encapsulation applications from a reaction mixture by the reaction injection molding process, wherein: A) an isocyanate component containing an isophorone diisocyanate (IPDI) trimer/monomer mixture having an NCO content of from 24.5 to 34% by weight, is reacted with B) isocyanate-reactive components comprising: b1) a polyetherpolyol having terminal OH groups, an average nominal functionality of 2 to 4, and an average equivalent weight of from 800 to 4000; b2) at least one chain extender component having as functional groups only aliphatic or alicyclic OH groups; b3) at least one amine-initiator component; in the presence of C) at least one catalyst component selected from the group consisting of organolead (II), organobismuth (III), and organotin (IV) catalysts; D) at least one pigment component, and E) at least one antioxidant/UV absorber component.

31 Claims, No Drawings

LIGHT-STABLE ELASTOMERIC POLYURETHANE MOULDINGS AND PROCESS FOR THE PRODUCTION THEREOF

The present invention relates to micro-cellular or non-cellular, light-stable, elastomeric, flexible or semi-flexible polyurethane mouldings having a density of at least 900 kg/m$^3$ and a flexural modulus according to ASTM D790 of between 5 and 300 MPa, and in particular between 10 and 120 MPa, from a reaction mixture by the reaction injection moulding process (RIM) and to a process for the production thereof.

For the production of light-stable polyurethanes, it is known to use aliphatic or alicyclic isocyanates instead of aromatic isocyanates. In comparison with aromatic isocyanates, aliphatic or alicyclic isocyanates have however a much lower reactivity which causes problems with respect to obtaining a sufficiently short demoulding time. From a commercial point of view, the demoulding times should preferably be shorter than 60 seconds.

Reducing the demoulding time by using particular catalytic systems have already been considered for example in U.S. Pat. No. 4,150,206 and U.S. Pat. No. 4,292,411, more particularly for integral skin applications. The catalytic systems proposed in these U.S. patents consisted essentially in the combination of a low-molecular weight amine-initiator with an organolead or respectively an organobismuth catalyst. The proposed catalytic systems were described with reference to a broad range of different integral skin foams or elastomers, and numerous examples were given wherein the demoulding time ranged from 1 to 6 minutes.

The present invention is, however, directed to very particular light-stable polyurethane elastomers which are also especially suited for so-called window-encapsulation applications wherein a gasket is moulded around the periphery of a window, in particular a car window, which gasket serves to mount the window in the car frame. This gasket or other moulded structures on the window, must meet very severe requirements as to light and heat stability, mechanical strength, softness and adhesion to the window and the frame. Moreover, it is clear that the moulding process should enable a sufficiently short demoulding time, preferably less than 60 seconds, to be economically feasible.

In the process according to the invention, use is made of an IPDI based isocyanate component since it is more user friendly than for example HDI, from which the monomer fraction has first of all to be stripped off as described in EP-A-0 690 085, in view of its high volatility and its strong eye-irritating effects. An important drawback of IPDI is however its reactivity, which is even lower than the reactivity of HDI. In this respect, EP-A-0 690 085 and U.S. Pat. No. 5,502,147 teach to use HDI instead of IPDI as isocyanate since the use of IPDI in the cited prior U.S. Pat. No. 4,772,639 requires generally demoulding times of about 3 to 10 minutes, and in the specific examples even 5 to 10 minutes, notwithstanding the fact that an organometal catalyst was used in combination with an amine-initiator and with particular trimerization products on the basis of HDI and optionally IPDI.

According to the invention, a new process and a new polyurethane elastomer have been found which enable to produce, within an economically acceptable cycle-time, light-stable elastomeric polyurethane mouldings on the basis of an IPDI based isocyanate component, which mouldings are in particular suited for window encapsulation applications.

The process according to the invention is characterized to this end more particularly by the composition of the different components of the polyurethane reaction mixture and by the conditions wherein the reaction injection moulding process is carried out, as defined in annexed claim 1.

In general the process according to the present invention is directed to the production of light-stable elastomeric polyurethane mouldings by the reaction injection moulding (RIM) process, which mouldings are suited for window-encapsulation applications but which may also be used for other applications, for example for interior trim parts of cars or other vehicles such as door panels, coverlids, etc. or even furniture parts. The obtained polyurethane mouldings are non-cellular or micro-cellular and have a density of at least 900 kg/m$^3$. They are flexible or semi-flexible and have more particularly a flexural modulus according to ASTM D790 of between 5 and 300 MPa, typically between 10 and 120 MPa and most typically between 10 and 70 MPa.

In the process according to the invention, a reaction mixture is injected under a high pressure in a closed mould wherein an insert has usually been positioned in advance, for example the periphery of a window. This reaction mixture comprises an IPDI based isocyanate component A, isocyanate-reactive components B and at least one catalyst, at least one pigment and at least one antioxidant and UV absorber.

The isocyanate component A comprises an IPDI trimer/monomer mixture which has an NCO content of from 24.5 to 34, preferably from 26 to 32% by weight, and hence an average calculated functionality of from 2.2 to 2.7 and a calculated trimer content of from 20 to 70% by weight. These calculated values are based on the presumption that pure monomeric IPDI has a theoretic NCO content of 37.8% and a functionality of 2 whilst pure trimeric IPDI has a theoretical NCO content of 18.9% and a theoretical functionality of 3, thus possible oligomers which may be present in the IPDI trimer are not taken into account in the above calculated values. It has been found that, in combination with the particular selection of the other components described hereinafter, a sufficiently short demoulding time and a good light and heat stability can be obtained for values above the given lower limits whilst these values should remain below the given upper limits, since otherwise the mechanical strength would be lower (i.e. a more brittle polyurethane material), the material would be more rigid and the viscosity of the isocyanate component would be too high in view of an optimal processability and mixing of the components. The most preferred IPDI trimer is the isocyanurate derivative IPDI.

In addition to the IPDI monomers and trimers, the isocyanate component may optionally further comprise up to 10% by weight of IPDI prepolymers with isocyanate-reactive compounds containing 2 to 4 isocyanate-reactive hydrogen containing groups, preferably hydroxyl groups. The addition of such prepolymers may enhance the glass adhesion properties.

As to the isocyanate component, it should be noted that this component may comprise, in addition to the IPDI monomer/trimer mixture, small amounts of further isocyanate monomers or polymers, in particular HDI trimers, preferably in an amount lower than 5% by weight, based on the weight of the isocyanate component.

The isocyanate-reactive components B comprise a polyetherpolyol component (b1), a chain extender component (b2) with only OH groups, in particular glycols, and an amine-initiator (b3) which forms a co-catalytic system with the main catalyst(s) (C) and which comprises cross-linkers and/or chain extenders.

The polyetherpolyol component b1 comprises only polyetherpolyols with terminal OH groups. It should be noted that use can be made of single polyols or of polyol mixtures. They have an average equivalent weight of from 800 to 4000, preferably from 1000 to 2000 and a nominal average functionality of between 2 and 4. The primary OH content is generally comprised between 0 and 95% and more particularly between 0 and 90%, except when use is made, in a first embodiment of the invention, of a polytetramethylene glycol (PTMG) as polyetherpolyol. Indeed, such PTMG's have a primary OH content of 100% and a nominal functionality of 2.

In a preferred embodiment of the process according to the invention, use is however made as polyetherpolyol component b1 of an addition product of propylene oxide (PO) and optionally ethylene oxide (EO) on a low molecular weight initiator of the polyalcohol type, the amount of ethylene oxide, if present, being lower than 30% of the total amount of ethylene oxide and propylene oxide.

The nominal functionality of such polyetherpolyol corresponds to the functionality of the used initiator or the nominal average functionality of the used initiators in case of a polyol mixture. In practice, the real functionality of a conventional polyetherpolyol is lower than its nominal functionality due to the fact that a portion of the used PO may isomerise during the polymerization reaction, thus also forming unsaturated mono-ols (functionality=1). In case of the conventional, alkaline (KOH) catalyzed polymerisation reactions, the equivalent mono-ol content may for example amount up to 20%, and is typically comprised between 5 and 20%, so that for example a nominal functionality of 2 and 3 corresponds to a typical real functionality of about 1.7 respectively about 2.5. At present, there exits however a new generation of DMC (double metal cyanide) catalyzed polyetherpolyols having a strongly reduced equivalent mono-ol content (till less than 5%, and typically between 0.5 and 3%) so that their real functionality approaches much more their nominal functionality. Such polyetherpolyols are for example available from ARCO (ACCLAIM® series) and OLIN and are for example described in U.S. Pat. No. 5,426,081; U.S. Pat. No. 5,470,813 and U.S. Pat. No. 5,498,583, which are incorporated herein by way of reference.

According to the invention, polyetherpolyols with a low till even zero primary OH content can be used still assuring a sufficient cure speed. In view of further reducing the needed cure or demoulding time in case of conventional polyetherpolyols, use is preferably made of a polyetherpolyol having a primary OH content of at least 70% and preferably of at least 80%, and/or the base polyetherpolyol is prepolymerised with a portion of the isocyanate component, preferably the IPDI monomer, to form a quasi polyolprepolymer (QPP) with terminal OH groups. In case of QPP, the preferred primary OH content is at least 40% and still more preferred at least 70%. The prepolymerisation reaction for forming the QPP is carried out in the presence of a suitable catalyst, such as organolead, organotin or organobismuth carboxylates, and/or at a higher temperature, for example at a temperature in the range of 20 to 100° C. depending on the catalyst level. The optimum final viscosity of such QPP polyol is 1.5 to 10 times higher than the viscosity of the starting base polyol while the viscosity of the final QPP polyol at 25° C. should anyway be lower than 10,000 mPas and preferably lower than 6,000 mPas in order to assure optimum mixing and flow of the reactive PU mix in the mould. Basic advantages of the use of QPP are thus first of all that it increases the reactivity, i.e. cure speed, of the reaction mixture (due to its higher initial molecular weight leading to a faster molecular weight built-up of the reaction mixture), in contrast to isocyanate prepolymers with terminal NCO groups (where lowering the NCO content reduces the number of exothermic reactions), and secondly that the viscosity of the polyol blend and in this way in particular the physical stability thereof is increased so that in other words less setting or decantation, separation of the components occur in the blend when it is not stirred. In view of these advantages a particular preference is given to the use of the quasi polyolprepolymers with terminal OH groups (QPP) in the process according to the present invention.

In case of conventional polyetherpolyols, preference is further given, in view of reducing the needed cure or demoulding time, to a nominal average functionality of from 2.5 to 4 and an average equivalent weight of from 1000 to 1500, especially in case the polyetherpolyol has a primary OH content lower than 70%, or in case of a QPP modified polyetherpolyol, a primary OH content lower than 40%.

According to a preferred embodiment of the invention, it has been found that the cure or demoulding time can also be reduced by making use of a polyetherpolyol having a low mono-ol content, in particular an equivalent mono-ol content lower than 5%. As described hereinabove, such polyetherpolyols are for example available from ARCO. These DCM catalysed polyetherpolyols have not only a low mono-ol content but in most cases also a low till zero primary OH and EO content. Such low equivalent mono-ol content type polyetherpolyols are preferred in the process according to the present invention, not only in view of the higher reactivity, but also in view of the additional mechanical strength and weathering resistance which can be obtained therewith compared to conventional polyetherpolyols with the same nominal functionality and thus with a lower real functionality.

In case of polyetherpolyols having a low mono-ol content, preference is further given in view of reducing the cure or demoulding time to nominal average functionality of from 2 to 4, preferably 2 to 3 for a minimum stiffness of the elastomer, and to an average equivalent weight of from 1000 to 2000, especially in case the polyetherpolyol has a primary OH content lower than 40%. The low mono-ol polyetherpolyol may further be prepolymerized, just like the conventional polyetherpolyols, to a quasi polyol prepolymer (QPP) with terminal OH groups.

An advantage of the hereinabove described preferred embodiments, wherein a further reduction of the cure or demoulding time can be achieved, is also that they enable to use a smaller amount of catalyst for a given demoulding time, resulting in improved elastomer properties. Further, it may be important to use polyetherpolyols or mixtures thereof having a low average primary OH content of for example between 0 and 40%, and therefore a low average EO content, in particular lower than 20% and preferably lower than or equal to 10%, especially in view of the water absorption and related wrinkling characteristics of the elastomer since a certain amount of primary OH groups in the polyetherpolyol are formed by terminal ethylene oxide (EO) capping and therefore a minimum EO amount is thus required for forming a certain amount of primary OH groups. In case of polyetherpolyols with a low primary OH content, preference is given in the process according to the present invention to the use of QPP and/or little mono-ol containing polyols for reducing the demoulding time. In this way, the amount of EO with respect to the sum of EO and PO, can easily be less than 10%, and may even comprise 0%, to achieve a maximum reduction of the water absorption and related wrinkling effects of the encapsulated PU elastomer.

Indeed, in view of reducing the water absorption, the amount of hydrophilic ethylene oxide units in the polyetherpolyol is preferably lower than 20% of the total amount of EO and PO, i.e. of the sum of the number of EO and PO units, and most preferably lower than or equal to 10%.

As already mentioned hereinabove, the used polyetherpolyols have a nominal functionality of 2 to 4. In case use is made of conventional polyetherpolyols, the nominal functionality is preferably equal to about 3 whereas for the low mono-ol content polyetherpolyol types, the nominal functionality is preferably in the range of from 2 till 3. In combination with the above defined characteristics of the polycomponent, it is possible to obtain in this way the desired softness, mechanical strength and light and heat stability (WOM properties) and this combined with a sufficiently short demoulding time. An average real functionality of at least 2 is further preferred for reducing the water absorption of the elastomer, or in other words for obviating the so-called "wrinkling" risk described hereinafter, for improving the weather and heat stability and for decreasing the demoulding time.

Finally, polyesterpolyols are not selected any more as components b1 in this invention because, in many cases, an unexplained migration/incompatibility effect has been found resulting in a greasy PU surface after ageing.

The chain extender component b2 comprises chain extenders with only OH groups as functional groups, more particularly aliphatic or alicyclic OH groups, and is used in an amount of from about 3 to about 20% by weight, and preferably from about 5 to about 15% by weight, based on the weight of components b1, b2 and b3. In view of the required short demoulding time, in combination with the required properties of the elastomer, i.e. the softness, mechanical strength, etc., these chain extenders have according to the invention a functionality equal to 2, an equivalent weight of up to 80 at the most, and a primary OH content of at least 50%.

Typical examples of the chain extenders b2 with only OH groups as functional groups are: ethylene glycol, propanediol (different isomers), butanediol (different isomers), pentanediol (different isomers), hexanediol (different isomers), diethylene glycol, 2-methyl-1,3-propanediol, 3-methyl-1,5-pentanediol, 1,4-cyclohexanediol, neopenthyl glycol, and 1,4-cyclohexane dimethanol.

The amine-initiator component b3 is used in an amount of from about 2 to about 10% by weight, and preferably from about 2.5 to about 6% by weight, based on the weight of components b1, b2 and b3. Also in view of the required short demoulding time and the required mechanical properties, and the light and heat stability of the polyurethane elastomer, the amine initiators have according to the invention from two to three functional aliphatic NH, $NH_2$ or OH groups, at least one of which is a secondary or primary amino group, and an equivalent weight of up to 150 at the most, preferably of up to 100 at the most. The compounds are thus aliphatic or alicyclic polyamines or alkanolamines.

The amine-initiators are preferably selected from the following different compounds:
  I. Crosslinkers of the alkanolamine type with one secondary NH group and two OH groups, preferably primary OH groups. Typical examples are i.a. diethanolamine (DEOA) and diisopropylamine, preference being given to DEOA.
  II. Extenders with one primary $NH_2$ group and one primary OH group located on vicinal carbon atoms. In these extenders, the reactivity of the primary $NH_2$ group is reduced by the vicinal C—OH group due to the sterical hindrance and/or the electron withdrawing action of the oxygen atom in the vicinal OH group. This essential part of this type of amine-initiators can be represented as follows:

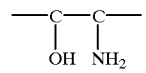

Typical examples are monoethanolamine (MEOA) and 2-amino-2-methyl (or ethyl) 1-propanol, preference being given to MEOA.
  III. Extenders with one secondary NH group and one primary OH group. Typical examples are N-methyl (or ethyl) ethanolamine (=monomethyl (or ethyl) ethanolamine).
  IV. Extenders with two primary $NH_2$ groups, at least one of which is situated on an alicyclic ring. A preferred example is isophorone diamine (IPDA).
  V. Extenders with two secondary NH groups, having a branched alkyl or cycloalkyl group with at least four C atoms attached thereto, or crosslinkers with three secondary NH groups, at least two of which having a branched alkyl or cycloalkyl group with at least four C atoms attached thereto. The branched alkyl or the cycloalkyl group is for example isohexyl, tert.butyl, cyclohexyl, etc. Preferred examples are

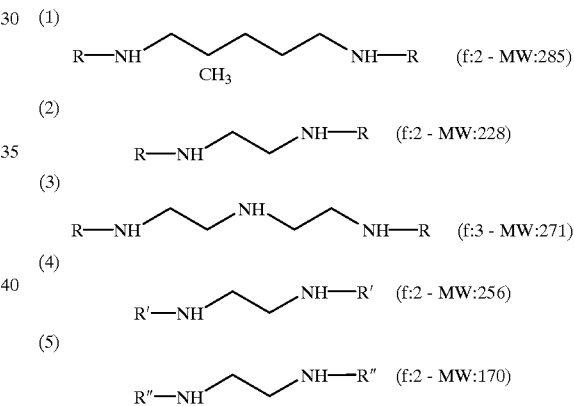

R group in examples (1)–(3) is isohexyl
R' group in example (4) is

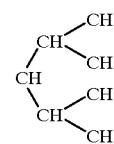

R" group in example (5) is tert.butyl.
Especially amine-initiators of classes I, II and V are preferred.

In view of achieving an optimal demoulding time, the amine-initiator comprises preferably at least 1% by weight of DEOA crosslinker, based on the weight of components b1, b2 and b3 and, in view of increasing the mechanical strength properties, preferably in combination with an amine-initiator of the extender type, in particular MEOA, resulting in an average amine-initiator functionality of between 2 and 3. In general, a higher functionality results in a shorter demoulding time but also in a lower mechanical strength, especially for soft elastomer types, and vice versa a lower functionality results in an increased mechanical strength but in a longer demoulding time. According to the invention, it has been found in this respect that especially for softer polyurethane elastomer types, having a flexural modulus lower than 120 MPa, more particularly lower than 70 MPa and especially lower than 30 MPa, good mechanical properties could be reconciled with a sufficiently short demoulding time for an average amine-initiator(s) functionality situated between 2 and 3, unless DMC catalyzed polyols with low mono-ol content are used, in which case the functionality of the amine-initiator may also be 3, still allowing good mechanical strength properties of soft elastomer types.

With respect to the amounts of the different amine-initiators, it was further found that in case the amine-initiator contains 2 primary $NH_2$ aliphatic groups, the amount thereof should preferably be less than 1.5% by weight, based on the weight of components b1, b2 and b3, and preferably less than 3% by weight if at least one primary $NH_2$ group is attached to an alicyclic ring, in order to avoid a bad flow of the reaction mixture in the mould and also a longer demoulding time.

The catalytic system C of the process according to the present invention comprises, in addition to the above described amine-initiator, at least one catalyst selected from the group consisting of organolead (II), organobismuth (III), and organotin (IV) catalysts, this latter catalyst in combination with said organolead and/or organobismuth catalyst and/or in combination with a diazobicyclo-alkene catalyst. Suitable organolead and organobismuth catalysts are described respectively in U.S. Pat. No. 4,150,206 and U.S. Pat. No. 4,292,411, which descriptions are incorporated herein by way of reference. The intended organolead and organobismuth catalysts are in particular lead (II) or bismuth (III) salts of carboxylic acids.

According to the invention, the maximum concentration of the organolead catalyst comprises 1.5% by weight, preferably 1% by weight, and most preferably 0.5% by weight, based on the weight of components b1, b2 and b3, in order to reduce the risk for an undesired metallic gloss appearance on the polyurethane elastomer surface after ageing or storing in case of dark colors. In case the demoulding time would still be too long, other co-catalysts can be used in addition to the amine-initiators, preference being given amongst others to diazobicycloalkene catalysts and/or said organotin catalysts, the combination of both these latter co-catalysts being most preferred. In combination with the organolead catalyst, the diazobicyclo-alkene catalyst is used preferably in an amount of 0.1 to 1% by weight, and the organotin catalyst in an amount of 0.2 to 1% by weight, based on the weight of components b1, b2 and b3. In order to compensate for the lower amount of organolead catalyst, the demoulding times can also be reduced by making use of the above-described quasi polyolprepolymers, little mono-ol containing polyols or by adding organobismuth catalyst.

According to the invention, the maximum concentration of the organobismuth catalyst comprises 1,5% and preferably maximum 1% by weight, based on the weight of components b1, b2 and b3. Indeed, higher amounts could pose problems with respect to the chemical stability of the polyol blend since the organobismuth catalyst contains an amount of free acid which may interfere with the possible alkaline catalyst or amine initiator components in the polyol blend. The amount of free acid in the organobismuth catalyst comprises less than 60%, and preferably less than 25%, most preferably less than 10%.

Just as the organolead catalyst, the demoulding times can further be reduced by making use of quasi polyolprepolymers, little mono-ol containing polyols or of the additional diazobicyclo-alkene or organotin catalyst in the above-mentioned amounts, preference being given in this case to the combination of the organobismuth catalyst with to organotin catalyst. Further, the organobismuth catalyst can be used in combination with the organolead catalyst.

In case the organotin catalyst is used without organolead or organobismuth catalyst, its maximum concentration comprises 3% by weight, based on the weight of components b1, b2 and b3. In this case the organotin catalyst is used in combination with the diazobicyclo-alkene catalyst, more particularly in combination with 0.3 to 1% by weight, based on the weight of components b1, b2 and b3, of this latter catalyst.

The organotin catalysts are in particular either dialkyldistannoxane dicarboxylates corresponding to the general formula:

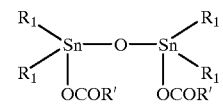

wherein $R_1$ is a ($C_1$–$C_4$) alkyl radical and R' a ($C_1$–$C_{12}$) whether or not branched alkyl radical;

or Sn (IV) carboxylates or dialkyltindialkoxides corresponding respectively to the general formulae:

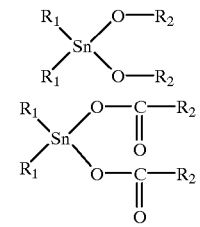

wherein $R_1$ is a ($C_1$–$C_4$) alkyl radical and $R_2$ forms a ($C_1$–$C_{12}$) alkyl radical or a naphthenic acid radical, the alkyl radicals being linear or branched, preference being given to compounds wherein $R_1$ is a methyl group and $R_2$ a ($C_1$–$C_{11}$) alkyl radical or a naphthenic acid radical, or also wherein $R_1$ is a butyl group and $R_2$ is a ($C_1$–$C_4$) alkyl radical;

or dialkyltindichlorides wherein the alkyl group is a $C_1$ to $C_4$ alkyl group.

Most preferred are Sn(IV) carboxylates wherein $R_1$ is a methyl group and $R_2$ a $C_1$–$C_{11}$ alkyl group.

The diazobicylco-alkene catalysts are either diazobicycloalkenes as such or salts thereof with weak acids, including phenol, having a $pK_a$ value higher than 4. They correspond to the general formula:

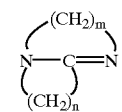

wherein
m=3–7
n=2–4.

A typical preference is given to 1,8-diazobicyclo-(5,4,0)-undecene-7 as well as to the octoate or phenolate salt of this compound, the phenolate salt being most preferred.

In the process according to the present invention, use is further made of anorganic or organic pigments which are insoluble in the reaction mixture and which are typically dispersed in the isocyanate- reactive compound. They are inherently sufficiently light and heat stable and are used in a concentration of 0.15 to 10% by weight solids, based on the weight of the reaction mixture, and preferably in a minimum concentration of at least 0.3% by weight solids. Typical examples are carbon black, titanium oxide, etc. The employed pigments provide for the hiding power of the polyurethane material so that it is in other words no longer transparent, which is especially important for the intended window-encapsulation or interior car trim applications.

In these latter applications, the polyurethane elastomer materials have further to be resistant to severe weathering conditions, involving the combination of UV, oxygen and heat, and may not discolour under these conditions. Use is therefore made in the process according to the present invention of UV absorbers and antioxidantia.

The antioxidantia comprises in particular so-called primary oxidantia, namely preferably:

0.1 to 1% by weight, preferably 0.2 to 0.6% by weight, based on the weight of the total reaction mixture, of primary antioxidantia of the substituted phenol type; and 0.1 to 1% by weight, preferably 0.2 to 0.6% by weight, based on the weight of the total reaction mixture, of HALS (Hindered Aliphatic Light Stabilisers) type substituted alicyclic amines;

and optionally secondary antioxidantia, namely:

0 to 5% by weight, preferably less than 3% by weight, based on the weight of the total reaction mixture, of peroxide decomposers, preferably of the aliphatic or aromatic organophosphite type;

The used UV absorbers are preferably of the benzotriazole type and are used in particular in an amount of 0.1 to 1% by weight, preferably 0.2 to 0.6% by weight, based on the weight of the reaction mixture.

Optionally, further components can be used in the process according to the invention such as:

water absorbers which are added to the isocyanate reactive compound in order to reduce the risk for pinholes, for example zeolites, dry calcium oxide, etc.;

emulsifiers/flow modifiers amongst others for improving the mixing and the compatability of the different components in the polyol blend and/or for improving the homogeneity of the flow of the reactive polyurethane mixture in the mould;

internal release agents, added to the polyol or possibly to the isocyanate compound, such as for example polydimethylsiloxanepolyether copolymers with free OH groups, metal salts of fatty acids (for example zinc stearate), and different fatty acid derivatives (fatty acid esters, amides, . . . ), which permit to reduce the concentration and the application frequency of the external release agents;

internal glass primers, type silanes (including amongst others also reactive silanes, i.e. silanes with active groups with respect to the polyurethane elastomer), which permit to omit or reduce the amount of external glass primers in window-encapsulation applications; and other additional components which are known per se for polyurethane moulding processes.

In the process according to the invention, the above-described polyurethane reaction mixture is processed according to the RIM technology, more particularly according to the two-component RIM technology with mixing via counter current, wherein the isocyanate and the polyol compound are supplied under high pressure to the mixing chamber from which the reaction mixture is injected in the closed mould. The polyol compound and the isocyanate compound are mixed according to an isocyanate index (NCO index) of 90 to 120, more preferred 95 to 110, and most preferred from 100 to 110. This mould usually contains already a rigid or flexible insert, especially the periphery of a window which is to be encapsulated with a flexible or semi-flexible polyurethane gasket. In some applications, the entire surface of an insert can be coated with the polyurethane elastomer, for example in case of smaller pieces to be mounted for example in a dashboard, or even larger pieces such as an entire door panel. The thickness of the polyurethane elastomer is typically comprised between 0.5 and 5 mm, and more typically between 1 and 4 mm.

The two overall components or blends of the reaction mixture, i.e. the isocyanate blend and the polyol blend, contain the different components described hereinabove. The isocyanate blend contains more particularly the isocyanate component A, the organotin catalyst and possibly the antioxidantia, UV absorbers, and the internal release agents and glass primers. The polyol blend, on the other hand, contains the isocyanate reactive components b1, b2 and b3, the catalysts (except the organotin catalyst), the pigments, possibly the antioxidantia and UV absorbers, the water absorbers, emulsifiers, and optionally the internal release agents and glass primers.

An important aspect of the polyol blend is its chemical and physical stability. The chemical stability is obtained by the reduced amount of "acidic" organobismuth catalyst, the absence of organotin catalyst and the restricted amount of water, which is especially important in the presence of an organolead catalyst. The physical stability is obtained by the used mixtures of components b1, b2, b3, C, colour pigment dispersions and optionally emulsifiers, especially in case component b2 comprises branched glycols, such as for example 2-methyl-1,3-propanediol and 3-methyl-1,5-pentanediol, and by a polyol blend viscosity which is sufficiently high at the raw material temperature during storage or production. The polyol blend viscosity at 25° C. is for example higher than 400 mPas, preferably higher than 700 mPas while the viscosity at 45° C. is for example higher than 100 mPas, preferably higher than 200 mPas. As set forth hereinabove, this viscosity can for example be increased by forming a quasi polyolprepolymer from the polyetherpolyol.

In view of the required short demoulding time, the mould is, according to the invention, preheated to a temperature of from 60 to 130° C., preferably from 80 to 120° C., and the reaction mixture is injected at a temperature of between 30 and 80° C., preferably between 40 and 60° C. At these temperatures the polyol and the isocyanate blends have preferably a viscosity of 150 to 2500 mPas, more preferably of 200 to 2000 mPas.

Before closing the mould, a so-called external mould release agent is applied to the mould surface. Especially in case of window encapsulation applications wherein the elastomeric moulding will be glued into a car frame with a separate PU glue, use in preferably made according to the invention of a wax having a melting point or range at least equal to but preferably higher than the mould temperature, typically 0 to 30° C. higher than the mould temperature. This mould temperature is preferably at least 80° C. and is most preferably comprised between 95 to 110° C. In this case the melting point range for the external release agent is typically comprised between 110 and 130° C. The wax is in particular dispersed in water or in an organic solvent.

According to the invention, it has surprisingly been found that by using high mould temperatures (higher than 60° C., preferably higher than 80° C. and most preferably between 95 and 110° C.) in combination with a release agent with a melting point which is at least equal to the mould temperature, the amount of pinholes on the polyurethane elastomer surface could be kept to a minimum. This is not only important for achieving an optimal visual aspect, such as required for automobile specifications, but also for obtaining an optimal adhesion from the polyurethane elastomer to the insert or to the polyurethane glue used for fixing the window into the car frame.

The minimum amount of pinholes is further obtained by using no physical blowing agents and by reducing the water content in the isocyanate reactive compound to a value smaller than 0.2% by weight, preferably smaller than 0.1% by weight, the amount of water in the total reaction mixture being less than 0.15% by weight, preferably less than 0.1% by weight.

By adding water absorbers (such as zeolites) in the polyol blend, the free water content can be further reduced till even approaching a zero value. In such a case, the risk of pinholes is also reduced, even at a lower mould temperature range, e.g. at 60 to 80° C.

According to the invention, it has been found that by the above-described special selections of process conditions and reaction mixture components, a RIM process is obtained which is surprisingly well suited for window-encapsulation applications, notwithstanding the severe conditions the produced elastomers have to resist and the particular characteristics which the elastomers have to present, amongst others as to softness, adhesion, mechanical strength, etc. Some of the these aspects are summarized hereinafter.

Adhesion of PU Elastomer to Glass Insert or PU Glue

In case of window-encapsulation applications, a good adhesion has to be obtained between the PU elastomer and:
  on the one hand, the local glass-insert surface against which the PU elastomer is injected in the mould; and
  on the other hand, in a later phase, the PU glue which serves to glue the PU elastomer to the frame of the vehicle.

In the above-described process according to the invention, an optimal adhesion can be obtained by the following combination:
  1) the particular selection of the different components of the polyurethane reaction mixture;
  2) the use of an external release agent having a melting point higher than or equal to the mould temperature so that no film of molten release agent is formed on the elastomer surface, which is hard to remove and which forms a physico-chemical barrier for interactions between the PU elastomer surface and glass or PU glue primers;
  3) a minimum amount of pinholes as explained hereinabove;
  4) the use of appropriate cleaners-primers (adhesion-promoters). A typical example of such cleaners-primers applied to the glass surface is a mixture of reactive silanes, a solvent known per se, such as ethylacetate, and optionally PU prepolymers having a surplus of NCO groups; and a typical example of cleaners-primers applied to the PU elastomer is a mixture of a PU prepolymer, having a surplus of NCO groups, and solvents; and
  5) a sufficiently high mechanical strength of the PU elastomer, i.a. tensile strength and tear resistance, for sufficiently high peel off forces during adhesion tests, achieved in particular by the particular selection of the different components of the reaction mixture.

Light and Heat Stability

The process according to the invention enables to obtain a polyurethane elastomer which can be used in external window-encapsulation applications wherein they have to comply with the strictest requirements. No substantial surface degradation (surface cracks, chalking), discoloration or gloss changes should occur i.a. in the following weathering tests:
  accelerated weathering (WOM) tests up to 1000 till 2000 hours, with xenon or carbon arc light source and:
    a black panel temperature of 45 to 90° C.;
    a continuous or alternate illumination/rain, for example according to the ASTM G26-83 test standard, the General Motors GME 00-002/SAE J1960 test standard, etc.
  long-term, direct exposure in practical field-tests for more than one year, i.a. in Florida and Arizona.

This performance can be achieved i.a. by the combination of the following elements in the PU elastomer formulations:
  1) the particular choice of the isocyanate component, containing in particular at least 20% IPDI trimer in the IPDI trimer/monomer mixture and having an average functionality of at least 2.2;
  2) the described type and concentration of the antioxidantia/UV absorbers;
  3) the amine-initiators having a functionality of at least 2; and
  4) the type and concentration of colour pigments.

Combination of the Required Softness and Mechanical Strength

The PU elastomers produced by the process according to the present invention must generally have a flexural modulus according to ASTM D790 in the range of 5 to 300 MPa, but especially within the range of 10 to 120 MPa and most typically within the range of 10 to 70 MPa.

However, the mechanical strength properties, i.a. the tensile strength and tear resistance, are on the other hand reduced in case of:
  a softer material, i.e. in case of a lower concentration of extenders and/or a lower NCO index;
  an increased trimer percentage in the IPDI mixture.

According to the present invention, it has been found that a sufficient softness of the PU material, on the one hand, and a sufficient mechanical strength, a sufficient light and heat stability and a sufficiently short demoulding time (quick curing) on the other hand, could surprisingly be reconciled with one another, even when use is made of IPDI, by the particular formulations according to the invention, i.a.:
  1) the polyol type, i.e. a polyetherpolyol having an average nominal functionality of 2 to 4 and an average equivalent weight of from 800 to 4000, preferably from 1000 to 2000, which polyetherpolyol has either further preferably a low mono-ol content, preferably in combination with a primary OH content higher than 40%, or is prepolymerised to form a quasi polyolprepolymer with terminal OH groups, in which case said polyetherpolyol has a primary OH content of 0 to 90%, preferably of at least 40%, or has otherwise, in case of non-modified conventional polyetherpolyols, a primary OH content of at least 70%;
  2) the IPDI trimer/monomer mixture containing 20 to 70% by weight trimer (average functionality 2.2 to 2.7)

and having an NCO index of between 90 and 120, preferably of between 95 and 110;
3) the type and concentration of OH extenders containing two OH groups; and
4) the type and concentration of amine-initiators.

Water Absorption and Wrinkling

In case of a too high water absorption, for example when immersing the PU encapsulated window in water (especially cold water), local dimensional deformations ("wrinkling") may occur in the PU elastomer after a given time, especially in case of soft PU elastomer types and/or smaller PU profile thicknesses and/or longer lips of the PU profiles.

According to the present invention, it has been found that such a phenomenon can be reduced by:
1) a minimum number of pinholes (micro-pores) on the PU elastomer surface; and
2) a sufficient physico-chemical and chemical cross-linking of the PU elastomer by the particularly selected formulations, i.a.:
   the type, functionality (f) and concentration of the polyetherpolyol (b1) (real functionality$\geq$2 and % EO<30%, pref.<20%, most pref.<10% with respect to the sum of PO and EO), extenders (b2), amine-initiators (b3) (f$\geq$2), and the use of IPDI trimer so that the functionality of the isocyanate component is at least higher than 2.2;
   the NCO index, which is preferably higher than 95 and most preferably higher than or equal to 100, in case of conventional base polyols with a relatively high mono-ol and EO content.

According to the invention, the water absorption can be reduced to a value of less than 10% by weight, and in case of an EO content$\leq$10%, even less than 3% by weight water uptake, after immersion of a PU sample, having a thickness of about 3 mm, in water at 2° C. during 72 hours.

The process according to the present invention is further illustrated hereinafter with reference to some specific examples.

EXAMPLES

I. Preparation Conditions of Moulded RIM Test Plates

Polyol blend (A side) and isocyanate blend (B side) are mixed in a two component high pressure FPL10 mix head (CANNON), fixed to the mould, and injected through a fangate in a cast aluminium test mould with dimensions of 1000×200×3 mm, at a total output of 200 gr/sec.

Raw material temperature of A and B sides: 45° C.
Mould temperature: varies (standard: 105° C.)

Before injection, the mould surface is sprayed with an external release agent (ERA) of the wax type dispersed in water.

For testing adhesion of RIM pieces to glass (window encapsulation), glass inserts are put in a specific test mould. These glass inserts are then in situ encapsulated with the injected PU-RIM system.

The various components in the RIM formulations are divided (blended) as follows:

A side (polyol blend):
   H active components (polyols/extenders/crosslinkers)
   catalysts, type cat 1 or cat 2 or cat 4
   some antioxidantia/UV absorber (AO/UV) components
   colour pigment dispersion
   optionally other additives, such as internal release agents, emulsifiers, defoaming agents, water scavengers (eg zeolites).

B side (isocyanate blend):
   Isocyanate (IPDI monomer/IPDI isocyanurate mixtures)
   Catalyst type cat 3 (tincatalyst)
   Some AO/UV components Typical viscosity of A and B sides at 45° C. (mPas).

| | A side | | | | |
|---|---|---|---|---|---|
| Examples Nos. | 1–8 and 17 | 9–11 | 12 | 13/15/16 | 14 |
| Viscosity at 45° C. | 250 | 300 | 1700 | 150 | 550 |
| | B side | | | | |
| Examples Nos. | 1/2/3/5/6 9–17 | 4 | 7 | 8 | |
| Viscosity at 45° C. | 300 | 150 | 5 | 4000 | |

II. Raw Materials Used in the Examples: Abbreviations

Polyol A

Polyethertriol, made by polyaddition of alkylene oxides (PO and EO) to glycerine starter, with KOH catalyst.

MW: 4800/IOH number 35/nominal functionality: 3/85% primary OH groups/15% EO/viscosity at 25° C.: 800 mPas Polyol B Polyetherdiol, made by polyaddition of PO to a glycol starter, with special double metal cyanide (DMC) catalyst resulting in less mono-ol/unsaturates by-products, compared to conventional KOH catalysis.

trade name: ACCLAIM 2200 (ARCO CHEMICAL C°)

MW 2000/IOH number 56/functionality: 2
   zero primary OH groups (100% secondary OH groups)
   zero EO content (100% PO)
   viscosity at 20° C.: 460 mPas (160 mPas at 40° C.)
   unsaturates (mono-ols): 0.005 meq/gram Polyol C Polyethertriol, made by polyaddition of PO to glycerine starter, with DMC catalyst trade name: ACCLAIM 6300 (ARCO CHEMICAL C°)

MW 6000/IOH number 28/functionality: 3
   zero primary OH groups (100% secondary OH groups)
   zero EO content (100% PO)
   viscosity at 20° C.: 1900 mPas (600 mPas at 40° C.)
   unsaturates (mono-ols): 0.015 meq/gram Polyols B-QPP and C-QPP Quasi-prepolymer polyol with terminal OH groups, prepared by reacting a stoichiometric excess of respectively polyol B and polyol C with some IPDI monomer, resulting in a molecular weight extended polyol with increased viscosity and reduced IOH number.

Synthesis of Polyols B-QPP and C-QPP

Base polyol B or C is premixed with lead octoate (cat 1) at room temperature. Then IPDI is added while stirring. The final equilibrium viscosity and IOH number is reached after maximum 24 hours.

| | Composition (parts by weight) | | | Viscosity at equilibrium (mPas) | | IOH number |
|---|---|---|---|---|---|---|
| | Base polyol | IPDI | cat 1 | at 25° C. | at 45° C. | at equilibrium (measured) |
| Polyol B-QPP | 100 | 2.50 | 0.1 | 1000 | 250 | 44 |
| Polyol C-QPP | 100 | 1.15 | 0.2 | 5000 | 1700 | 22 |

Polyol D

Polyetherdiol, made by polyaddition of PO and EO onto a glycol starter, with special double metal cyanide (DMC) catalyst, resulting in less mono-ol/unsaturates by-products, compared to conventional KOH catalysis.

MW: 2000/IOH number 56/functionality 2/EW: 1000

55% primary OH groups/9% EO viscosity at 25° C.: 430 mPas unsaturates (mono-ols): 0.005 meq/gram.

Polyol E

Polyethertriol, made by polyaddition of PO onto a glycerine starter, with conventional KOH catalysis.

MW: 4000/IOH number 42/nominal functionality 3/EW: 1330 zero primary OH groups (100% secondary OH groups) and zero % EO (100% PO)

viscosity at 25° C.: 700 mPas

ISO A and ISO B and ISO C

In situ mixtures of IPDI monomer and IPDI isocyanurate trimer, prepared by in situ trimerisation of IPDI monomer, at high temperature, in the presence of a trimerisation catalyst, and by further diluting the reaction mixture with IPDI monomer till the required final NCO content.

| | NCO | Average | Weight ratio IPDI | Viscosity (mPas) | |
|---|---|---|---|---|---|
| | content (%) | functionality (*) | monomer/ trimer (*) | at 25° C. | at 45° C. |
| ISO A | 28 | 2.52 | 48/52 | 1000 | 300 |
| ISO B | 32 | 2.31 | 69/31 | 400 | 150 |
| ISO C | 24 | 2.73 | 27/73 | 16000 | 4000 |

(*) calculated, assuming a theoretical functionality of 3 for pure IPDI trimer, and an NCO content 18.9%.

ISO D pure IPDI (isophorone diisocyanate)

functionality: 2/NCO content: 37.8%/viscosity at 20° C.: 15 mPas

EG monoethylene glycol (extender)

functionality: 2/equivalent weight: 31

MP diol 2 methyl 1,3 propanediol (extender)

functionality: 2/equivalent weight: 45.

DEOA diethanolamine (crosslinker/"amine initiator")

functionality: 3/equivalent weight: 35.

MEOA monoethanolamine (extender/"amine initiator")

functionality: 2/equivalent weight: 30.

Cat 1 lead 2 ethylhexoate ("lead octaoate")=Pb(II) carboxylate containing 33% by weight lead metal.

Remark: Given level of Cat 1 in the formulation examples thus includes the part of Cat 1 used to make QPP modified polyols in examples 9 to 12.

Cat 2 bismuth 2 ethylhexoate ("bismuth octoate")=Bi(III) carboxylate containing 24% by weight bismuth metal and less than 5% free acid.

Cat 3 dimethyltin dineodecanoate (Sn(IV) carboxylate)

Cat 4 phenol salt of 1.8 diazobicyclo [5,4,0] undecene-7

AO/UV mix consisting of:

0.5 parts triethylene glycol-bis-3(3-tert.butyl-4-hydroxy-5-methylphenyl)propionate which are added to A side (polyol blend)

0.5 parts 2(2-hydroxy-3,5-di-tert.amyl-phenyl)-2H-benzotriazole which are added to A side 0.5 parts bis(1,2,2,6,6-pentamethyl-4-piperidyl) sebacate which are added to B side (isocyanate blend)

4.5 parts tris(nonylphenyl)phosphite which are added to B side

Colour pigments black=carbon black white=titanium oxide (rutile type)

Baylith L (Bayer):

Water absorbing zeolite paste containing 50% dehydrated sodium potassium aluminosilicate.

Remark on weight ratios of various components in examples

All formulations are expressed in parts by weight, referring to 100 parts of H-active, i.e. isocyanate reactive components (polyols+extenders+crosslinkers)

In all cases, the pigments were predispersed in polyol A, respectively 20% solids for black and 50% solids for white. Of these dispersions, 5 parts were added in the formulations, corresponding with:

black: 1 part solid+4 parts polyol A white: 2.5 parts solid+2.5 parts polyol A

The polyol A, present in these colour dispersions, is included in the total level of polyol A such as given in the formulations.

ERA 1 and ERA 2 (external release agents)

Waxes, predispersed in organic solvents (hydrocarbons/propanol)

typical melting point wax: in ERA 1: approx. 120° C.; in ERA 2: approx. 90° C.

typical solid wax content in ERA dispersions: 1–2%

III. Reactivity Data and Physical Properties, Given in Examples: Abbreviations 1) Reactivity data FT: fibre forming time (in seconds): indicates the beginning of gelling (gel time), i.e. the moment at which a fibre can be drawn of the reaction mixture by means of a glass rod.

DT: demoulding time (in seconds), i.e. the cure time in the mould, allowing sufficient green strength, when demoulding the RIM piece, i.e. without surface tackiness, deformation or tearing upon demoulding.

2) Properties (thickness samples: 3 mm)

D: moulded PU elastomer density in gr/liter (=kg/m$^3$)

Emod: flexural elasticity modulus (in MPa) according to test method ASTM D790.IB Shore A: surface hardness (in units) according to test method DIN 53505

ER: ultimate elongation at break (in %) according to test method ASTM D412A

RR: tensile strength at break (in MPa) according to test method ASTM D412A

TR: tear resistance (in N/cm) according to test method ASTM D624C

WA: water absorption in % by weight of absorbed water, after immersing the RIM sample in water at 2° C. for 72 hours WOM: weatherometer test (accelerated light and heat/humidity test) under the following test conditions according ASTM G26/1
 ATLAS C134 apparatus with Xenon arc
 continuous illumination
 irradiance 0.55 W/m$^2$ at 340 nm
 black panel temperature: 63° C.
 cycle: 102 minutes dry/18 minutes water spray
 filters: outer: quartz/inner: borosilicate
 test time: 1500 hours After the WOM test, following criteria were evaluated:

DE: color change (measured with colorimeter)

gloss retention (%) where the initial sample gloss is approx. 75 in the high gloss test mould % retention of original gloss is given after polishing the surface of the aged test sample.

degradation: visual code
 0: not any surface degradation, even under microscope (magnification: 5033 )
 1: tendency for surface cracks under microscope
 2: slight surface cracks under microscope
 3: moderate surface cracks under microscope (still not visible without microscope)
 4/5: respectively tendency or slight till moderate surface cracks, visible without microscope.

Adhesion to glass (in case window encapsulation applications)

a) sample preparation:

typical automotive glass pieces (inserts) are cleaned with heptane, and are then successively treated with:
 cleaner BETAWIPE VP04604-GURIT ESSEX: by wipe on/wipe off. (solution of reactive silane in isopropanol)
 primer: BETAPRIME 5001-GURIT ESSEX: by wipe on (solution of isocyanate prepolymers and non reactive silanes in methyl ethyl ketone)

Cure of glass and primer during 2 hours at 50% RH/23° C.

these prepared glass pieces are put in a special test mould, whereafter the RIM system is injected at a high pressure.

the RIM encapsulated glass plates are then stored during 7 days in ambient conditions (23° C/50% RH) before testing the glass adhesion to the RIM surface by peel off measurements.

b) peel off tests (="glass adhesion")

measuring adhesion strength (N/cm) between glass (primer) and RIM surface by peel off under angle of 90°, according to method DIN-EN1464 if break between glass/primer and RIM interface →adhesion failure (AF)

If break in the core of the RIM sample itself →cohesion failure (CF).

tests are made on the encapsulated glass samples:
 at an initial stage, i.e. without extra ageing
 after cataplasm ageing cycle test:
  immersion in water of +23° C. during 7 days
  ageing of wet samples (packed in aluminum foil) in an oven at 70° C/7 days (100% RH)
  putting these samples in a refrigerator at −23° C. during 16 hours
  recondition in ambient conditions during 16 hours (23° C./50% RH) before peel off tests.

Adhesion to PU glue (in case given window encapsulated applications, where the encapsulated window is glued to the car frame, with a PU glue put on the RIM surface of the encapsulated window)

a) Sample preparation moulded RIM sample surface is cleaned with heptane surface is treated with a cleaner/activator, type BETAWIPE 4000 (GURIT ESSEX) by wipe on (Solution of polyisocyanates in ethylacetate)

5 minutes later, BETASEAL HV3 (GURIT ESSEX) is put on the treated RIM surface. HV3 is a highly viscous one component PU glue based on aromatic polyisocyanates, with 0.7% free NCO content the complex RIM/HV3 glue is stored in ambient conditions during 7 days, allowing the full care of the HV3(PU) glue.

b) peel off tests (PU glue adhesion)

evaluate adhesion (visually) between the HV3 glue and the RIM surface, by a manual peel of test under a 180° angle
 on initial RIM/HV3 samples
 on aged RIM/HV3 samples 70° C/100%RH/7 days recondition in ambient conditions (23° C./50%RH)

criterium OK=cohesion failure (CF) in the HV3 core itself criterium not OK=adhesion failure (AF) between the RIM/HV3 interface Visual appearance→metal gloss (code)

After storing the RIM pieces for 2 months in the dark, in some cases a "metal shine" gloss can locally appear, which is especially visible in case of:
 a dark color
 a higher organolead catalyst (cat 1) content Visual code, after 2 months storage in a typical flexible PU foam converting atmosphere/production area
 Code 0: not any metal gloss
 Code 1: tendency (slight): almost not visible
 Code 2: slight till moderate (visible)

IV Comments/interpretation of results in examples

Examples series 1A till 1

Soft light stable RIM elastomers were obtained according to the invention with excellent reactivity characteristics and properties, except following remarks in case:

Comparative ex 1E (mould temp: <60° C.): many micropores on RIM surface/on the limit regarding PU glue adhesion and acceptable demoulding time Example No. 1F: bad PU glue adhesion because too low melting point of used ERA, in relation to the mould temperature Example No. 1G: moderate metal gloss appearance on RIM surface (1 part cat 1)

Example No. 1C: higher water absorption, due to the lower NCO index of 90, in combination with polyol A.

Example series 2 till 8

Light stable RIM elastomers with various softness were obtained, with excellent reactivity characteristics and properties, except for comparative examples No. 7 and 8.

Ex. 7 (pure IPDI monomer/no trimer)
→too long demoulding time/lower reactivity
→various pinholes at the RIM surface
→low stiffness and tensile strength despite the use of a higher extender level and NCO index
→moderate metal gloss (1 part cat 1 used to increase reactivity)
→Poor WOM resistance (gloss retention/degradation)
→rather high water absorption Ex. 8 (too high trimer content in IPDI blend)
→too reactive/too viscous isocyanate blend, resulting in poor mixing and flow in the mould, resulting in surface defects such as pinholes etc.
→more brittle elastomer compared to other representative examples with similar stiffness.

Remark: by replacing in example 3 EG extender by MP diol extender, the physical stability of the polyol mixture (A side) was quite improved: no visual setting (decantation) after storage during 7 days at room temperature.

Example series 9 till 17

Light stable RIM elastomers with various softness were obtained, with good till excellent reactivity characteristics and properties.

Even if polyetherpolyols are used without QPP modification and/or with conventional KOH catalyst (examples 13 till 17), still good results were obtained. In these examples, the level of amine iniator or catalyst level was increased, in order to compensate some loss in reactivity, compared to the use of QPP modified polyols, or DMC catalyst based polyols with low mono-ol content.

Notice the excellent reactivity characteristics in examples 15 and 16, based on DMC catalyst diol (without QPP modification), containing 55% primary OH groups and a limited EO content (9%). In such case, the water absorption values are still good till excellent (even at an NCO index of 95), although somewhat higher, compared to the use of base polyols with zero EO content. For example the water absorption in Example 10 is still very low, despite using a low NCO index 90. This is due to the use of a hydrophobic, entirely PO based, polyol.

These samples showed also excellent results in practical wrinkling tests: no deformation of RIM surface after putting glass encapsulated RIM samples in cold water at 20° C. during 72 hours.

TABLE 1/1

| Ex n°: | 1A | 1B | 1C | 1D | 1E (comp.) | 1F | 1G/H | 1I |
|---|---|---|---|---|---|---|---|---|
| Polyol A | 89.5 | 89.5 | 89.5 | 89.5 | 89.5 | 89.5 | 88 | 89.5 |
| Polyol B | — | — | — | — | — | — | — | — |
| Polyol C | — | — | — | — | — | — | — | — |
| Polyol B-QPP | — | — | — | — | — | — | — | — |
| Polyol C-QPP | — | — | — | — | — | — | — | — |
| ISO A | 56.8 | 56.8 | 56.8 | 56.8 | 56.8 | 56.8 | 63.1 | 56.8 |
| ISO B | — | — | — | — | — | — | — | — |
| ISO C or D | — | — | — | — | — | — | — | — |
| NCO index | 100 | 100 | 90 | 100 | 100 | 100 | 100 | 100 |
| EG | 7 | 7 | 7 | 7 | 7 | 7 | 6 | 7 |
| MP diol | — | — | — | — | — | — | — | — |
| DEOA | 3.5 | 3.5 | 3.5 | 3.5 | 3.5 | 3.5 | 6 | 3.5 |
| MEOA | — | — | — | — | — | — | — | — |
| Cat 1 | 0.5 | 0.5 | 0.5 | 0.5 | 0.5 | 0.5 | 1.0 | 0.5 |
| Cat 2 | — | — | — | — | — | — | — | — |
| Cat 3 | 0.25 | 0.25 | 0.25 | 0.25 | 0.25 | 0.25 | — | 0.25 |
| Cat 4 | 0.5 | 0.5 | 0.5 | 0.5 | 0.5 | 0.5 | — | 0.5 |
| AO/UV mix | 6 | 6 | 6 | 6 | 6 | 6 | 6 | 6 |
| Pigment (solid) | | | | | | | | |
| black | 1 | — | 1 | 1 | 1 | 1 | 1/— | 1 |
| white | — | 2.5 | — | — | — | — | —/2.5 | — |
| Baylith L | — | — | — | — | — | — | — | 2 |
| Mould temperature (° C.) | 105 | 105 | 105 | 80 | 50 | 105 | 105 | 80 |
| ERA type | 1 | 1 | 1 | 2 | 2 | 2 | 1 | 2 |

TABLE 1/2

Example series 1A till 1I: Reactivity and properties

| Ex. n° | 1A | 1B | 1C | 1D | 1E (comp.) | 1F | 1G/H | 1I |
|---|---|---|---|---|---|---|---|---|
| FT (sec) | 3 | 3 | 3 | 3 | 3 | 3 | 3 | 3 |
| DT (sec) | 30 | 30 | 30 | 35 | 60 | 30 | 40 | 40 |
| D (gr/l) | 1050 | 1050 | 1050 | 1050 | 1050 | 1050 | 1050 | 1080 |
| Emod (MPa) | 40 | 40 | 15 | 40 | 40 | 40 | 50 | 45 |
| Shore A | 88 | 88 | 80 | 88 | 86 | 88 | 90 | 89 |
| ER (%) | 170 | 170 | 200 | 195 | 190 | 170 | 150 | 160 |
| RR (MPa) | 12 | 12 | 8 | 10 | 9.5 | 12 | 12 | 13 |
| TR (N/cm) | 400 | 400 | 240 | 320 | 280 | 400 | 315 | 420 |
| WA (%) | 4.5 | 4.5 | 27 | 5 | 5 | 4.5 | 5 | 4 |
| WOM-1500 h | | | | | | | | |
| DE | 1.3 | 1.0 | 1.4 | 1.6 | 1.9 | 1.8 | 1.4/1.7 | 1.3 |
| Gloss ret (%) | 90 | 95 | 80 | 85 | 75 | 65 | 85/90 | 85 |
| degradation code | 0 | 0 | 0 | 0 | 1 | 0 | 0/0 | 0 |
| Adhesion to glass (N/cm) | | | | | | | | |
| before aging | 85 (AF) | 85 (AF) | 60 (AF) | 80 (AF) | 70 (AF) | 80 (AF) | 80 (AF) | 80 (AF) |
| after cataplasm | 75 (CF) | 75 (CF) | 55 (CF) | 75 (CF) | 60 (CF) | 70 (CF) | 70 (CF) | 80 (CF) |
| Adhesion to PU glue | CF | CF | CF | CF | CF/AF | AF | CF | CF |
| Visual appearance RIM surface | | | | | | | | |
| pinholes | OK | OK | OK | limit | NOT | OK | OK | OK |
| metal gloss (code) | 0–1 | 0 | 0–1 | 0–1 | 0–1 | 0–1 | 1/0 | 0–1 |

TABLE 2/1

Example series 2 till 8: formulations

| Ex n°: | 2 | 3 | 4 | 5 | 6 | 7 (comp.) | 8 (comp.) |
|---|---|---|---|---|---|---|---|
| Polyol A | 87.5 | 87.5 | 89.9 | 89.5 | 88 | 87.5 | 90.5 |
| Polyol B | — | — | — | — | — | — | — |
| Polyol C | — | — | — | — | — | — | — |
| Polyol B-QPP | — | — | — | — | — | — | — |
| Polyol C-QPP | — | — | — | — | — | — | — |
| ISO A | 70.3 | 53.5 | — | 56.8 | 63.1 | — | — |
| ISO B | — | — | 49.9 | — | — | — | — |
| ISO C or D | — | — | — | — | — | D:52.0 | C:61.0 |
| NCO index | 105 | 100 | 100 | 100 | 100 | 105 | 100 |
| EG | 9 | — | 7 | 7 | 6 | 9 | 6 |
| MP diol | — | 9 | — | — | — | — | — |
| DEOA | 3.5 | 3.5 | 1.4 | 3.5 | 6 | 3.5 | 3.5 |
| MEOA | — | — | 1.7 | — | — | — | — |
| Cat 1 | 0.5 | 0.5 | 0.5 | — | — | 1.2 | 0.5 |
| Cat 2 | — | — | — | 0.5 | — | — | — |
| Cat 3 | 0.25 | 0.25 | 0.25 | 0.5 | 2 | 0.25 | 0.20 |
| Cat 4 | 0.5 | 0.5 | 0.5 | — | 0.5 | 0.5 | 0.3 |
| AO/UV mix | 6 | 6 | 6 | 6 | 6 | 6 | 6 |
| Pigment (solid) | | | | | | | |
| black | 1 | 1 | 1 | 1 | 1 | 1 | 1 |
| white | — | — | — | — | — | — | — |
| Mould temperature (° C.) | 105 | 105 | 105 | 105 | 105 | 105 | 105 |
| ERA type | 1 | 1 | 1 | 1 | 1 | 1 | 1 |

TABLE 2/2

Example series 2 till 8: Reactivity and properties

| Ex. n° | 2 | 3 | 4 | 5 | 6 | 7 (comp.) | 8 (comp.) |
|---|---|---|---|---|---|---|---|
| FT (sec) | 3 | 4 | 4 | 2–3 | 4 | 8 | 2 |
| DT (sec) | 25 | 35 | 35 | 35 | 45 | >120 | 25 |
| D (gr/l) | 1050 | 1050 | 1020 | 1040 | 1050 | 1050 | 1030 |
| Emod (MPa) | 80 | 40 | 10 | 35 | 50 | 20 | 70 |
| Shore A | 92 | 87 | 78 | 85 | 87 | 75 | 93 |
| ER (%) | 175 | 170 | 260 | 200 | 160 | 190 | 95 |
| RR (MPa) | 16.5 | 11 | 9.5 | 10.5 | 11.5 | 6 | 10 |
| TR (N/cm) | 550 | 360 | 300 | 360 | 370 | 280 | 260 |
| WA (%) | 4 | 4 | 7 | 4.5 | 4.5 | 10 | 6 |
| WOM-1500 h | | | | | | | |
| DE | 1.2 | 1.5 | 1.4 | 1.2 | 1.4 | 1.6 | 1.4 |
| Gloss ret (%) | 90 | 85 | 65 | 65 | 75 | 40 | 70 |
| degradation code | 0 | 0 | 0 | 0 | 0 | 4 | 0 |
| Adhesion to glass (N/cm) | | | | | | | |
| before ageing | 115 (AF) | 79 (AF) | 60 (AF) | 70 (AF) | 80 (AF) | 55 (AF) | 83 (AF) |
| after cataplasm | 105 (CF) | 70 (CF) | 52 (CF) | 60 (CF) | 72 (CF) | 49 (CF) | 75 (CF) |
| Adhesion to PU glue | CF | CF | CF | CF | CF | CF | CF |
| Visual appearance RIM surface | | | | | | | |
| pinholes | OK | OK | OK | OK | OK | NOT OK | NOT OK |
| metal gloss (code) | 0–1 | 0–1 | 0–1 | 0 | 0 | 1–2 | 0–1 |

TABLE 3/1

Example series 9 till 17: formulations

| Ex n°: | 9 | 10 | 11 | 12 | 13 | 14 | 15 | 16 | 17 |
|---|---|---|---|---|---|---|---|---|---|
| Polyol A | 4 | 4 | 4 | 4 | 4 | 4 | 4 | 4 | 4 |
| Polyol B | — | — | — | — | 84 | — | — | — | — |
| Polyol C | — | — | — | — | — | 84 | — | — | — |
| Polyol B-QPP | 85.5 | 85.5 | 85.5 | — | — | — | — | — | — |
| Polyol C-QPP | — | — | — | 85.5 | — | — | — | — | — |
| Polyol D | — | — | — | — | — | — | 85.5 | 85.5 | — |
| Polyol E | — | — | — | — | — | — | — | — | 85.5 |
| ISO A | 60.2 | 54.2 | 60.2 | 54.3 | 67.9 | 61.2 | 58.9 | 58.9 | 58.8 |
| ISO B | — | — | — | — | — | — | — | — | — |
| ISO C or D | — | — | — | — | — | — | — | — | — |
| NCO index | 100 | 90 | 100 | 100 | 100 | 100 | 95 | 95 | 100 |
| EG | 7 | 7 | 7 | 7 | 6 | 6 | 7 | 7 | 7 |
| MP diol | — | — | — | — | — | — | — | — | — |
| DEOA | 3.5 | 3.5 | 3.5 | 3.5 | 6 | 6 | 3.5 | 3.5 | 3.5 |
| MEOA | — | — | — | — | — | — | — | — | — |
| Cat 1 | 1 | 1 | — | 0.5 | 0.5 | 0.5 | 0.5 | — | 0.8 |
| Cat 2 | — | — | 1 | — | — | — | — | 1.0 | — |
| Cat 3 | 0.5 | 0.5 | 0.5 | 0.5 | 0.5 | 0.5 | 0.5 | 0.5 | 0.5 |
| Cat 4 | — | — | — | 0.5 | 0.5 | 0.5 | 0.5 | — | 0.5 |
| AO/UV mix | 6 | 6 | 6 | 6 | 6 | 6 | 6 | 6 | 6 |
| Pigment (solid) | | | | | | | | | |
| black | 1 | 1 | 1 | 1 | 1 | 1 | 1 | 1 | 1 |
| white | — | — | — | — | — | — | — | — | — |
| Mould temperature (° C.) | 105 | 105 | 105 | 105 | 105 | 105 | 105 | 105 | 105 |
| ERA type | 1 | 1 | 1 | 1 | 1 | 1 | 1 | 1 | 1 |

TABLE 3/2

Example series 9 till 17: Reactivity and properties

| Ex. No/ | 9 | 10 | 11 | 12 | 13 | 14 | 15 | 16 | 17 |
|---|---|---|---|---|---|---|---|---|---|
| FT (sec) | 5 | 5 | 4 | 4 | 6 | 6 | 4 | 4 | 6 |
| DT (sec) | 35 | 45 | 40 | 30 | 40 | 35 | 30 | 30 | 45 |
| D (gr/l) | 1050 | 1020 | 1050 | 1050 | 1030 | 1040 | 1020 | 1030 | 1050 |
| Emod (MPa) | 25 | 10 | 25 | 35 | 45 | 50 | 15 | 20 | 25 |
| Shore A | 80 | 63 | 79 | 85 | 88 | 90 | 75 | 78 | 80 |
| ER (%) | 200 | 250 | 230 | 180 | 160 | 140 | 230 | 220 | 190 |
| RR (MPa) | 11 | 5.5 | 12 | 11.5 | 12 | 13 | 8.5 | 9 | 11 |
| TR (N/cm) | 300 | 170 | 350 | 350 | 300 | 310 | 250 | 280 | 250 |
| WA (%) | 1.5 | 1.8 | 1.5 | 1.5 | 1.4 | 1.3 | 2.8 | 2.6 | 1.4 |
| WOM-1500 h | | | | | | | | | |
| DE | 1.5 | 1.8 | 1.4 | 1.5 | 1.6 | 1.2 | 1.5 | 1.4 | 1.6 |
| Gloss ret (%) | 70 | 60 | 75 | 80 | 75 | 75 | 80 | 75 | 75 |
| degradation code | 0 | 1–2 | 0 | 0 | 0 | 0 | 0–1 | 0–1 | 0–1 |
| Adhesion to glass (N/cm) | | | | | | | | | |
| before ageing | 65 (AF) | 55 (AF) | 63 (AF) | 72 (AF) | 68 (AF) | 73 (AF) | 55 (AF) | 65 (AF) | 60 (AF) |
| after cataplasm | 58 (CF) | 55 (CF) | 55 (CF) | 65 (CF) | 60 (CF) | 65 (CF) | 48 (CF) | 55 (CF) | 55 (CF) |
| Adhesion to PU glue | CF | CF | CF | CF | CF | CF | CF | CF | CF |
| Visual appearance RIM surface | | | | | | | | | |
| pinholes | OK | limit OK | OK | OK | OK | OK | OK | OK | OK |
| metal gloss (code) | 1 | 1 | 0 | 0–1 | 0–1 | 0–1 | 0–1 | 0 | 1 |

What is claimed is:

1. A process for the production of micro-cellular or non-cellular, light stable elastomeric, flexible or semi-flexible polyurethane mouldings having a density of at least 900 kg/m$^3$ and a flexural modulus according to ASTM D790 of between 5 and 300 Mpa, from a reaction mixture by a reaction injection moulding process, wherein A) an isocyanate component comprising an isophorone diisocyanate (IPDI) timer/monomer mixture having an NCO content of from 24.5 to 34% by weight, is reacted with B) isocyanate-reactive components comprising:
  b1) a polyol component comprising a polyetherpolyol having terminal OH groups, an average nominal functionality of from 2 to 4, and an average equivalent weight of from 800 to 4000;
  b2) from about 3 to about 20% by weight, based on the weight of components b1, b2 and 3, of at least one chain extender component having as functional groups only aliphatic or alicyclic OH groups, a functionality of 2, equivalent weight of up to 80, and a primary OH content of at least 50%;
  b3) from about 2 to about 10% by weigh, based on the weight of components b1, b2 and b3, of at least one amine-initiator component forming a co-catalytic system with catalyst component C and having from 2 to 3 functional aliphatic NH, NH$_2$ or OH groups, at least one of which is a secondary or primary amino group, and an equivalent weight of up to 150, component b3 including at least 1% by weight of diethanolamine (DEOA), based on the weight of components b1, b2 and b3;

in the presence of

C) at least one catalyst component selected from the group consisting of organolead (II), organobismuth (III), and organotin (IV) catalysts, the maximum amount of each of these catalysts being respectively for the organolead catalyst 1.5% by weight, the organobismuth catalyst 1.5% by weight and for the organotin catalyst 3% by weight, based on the weight of components b1, b2 and b3, the organotin catalyst being used either in combination with the organolead and/or the organobismuth catalyst, and/or in combination with a diazobicyclo-alkene catalyst and/or a salt of this latter catalyst with a weak acid;

D) at least one pigment component, and

E) at least one antioxidant/UV absorber component;

wherein said components are processed via a two-component solvent-free polyurethane reaction injection moulding process at an isocyanate index of 90 to 120, in a closed mould preheated to a temperature of 80 to 130° C., wherein the reaction mixture is injected at a temperature of between 30 and 80° C., the polyurethane reaction mixture, being composed to enable a demoulding time of less than 60 seconds, is substantially free of physical blowing agents and containing up to 0.15% by weight, based on the total weight of the reaction mixture, of water.

2. The process of claim 1, wherein the polyetherpolyol component b1 is an addition product of propylene oxide and optionally ethylene oxide on a low molecular weight initiator, the amount of ethylene oxide, if present, being lower than 15% of the total amount of ethylene oxide and propylene oxide.

3. The process of claim 2, wherein said amount of ethylene oxide is lower than or equal to 10%.

4. The process of claim 2, wherein said polyetherpolyol has a primary OH content of at least 70%.

5. The process of claim 2, wherein said polyetherpolyol is prepolymerised with a portion of said isocyanate component to form a quasi polyolprepolymer with terminal OH groups.

6. The process of claim 4 or 5, wherein said polyetherpolyol has an average nominal functionality of from 2.5 to 4 and an average equivalent weight of from 1000 to 1500.

7. The process of claim 2, wherein the polyetherpolyol has an equivalent mono-ol content lower than 5%.

8. The process of claim 7, wherein said polyetherpolyol has a nominal average functionality of from 2 to 3 and an average equivalent weight of from 1000 to 2000.

9. The process of claims 5 or 7, wherein said polyetherpolyol has a primary OH content of at least 40%.

10. The process of claim 1, wherein the polyetherpolyol component b1 is a polytetramethylene glycol (PTMG).

11. The process of claim 1, wherein the IPDI trimer in said IPDI trimer/monomer mixture is an isophorone isocyanurate trimer.

12. The process of claim 1, wherein the mould is preheated up to a temperature of at least 90° C.

13. The process of claim 1, wherein an external release agent is applied in the mould before injecting the reaction mixture, said release agent having a melting point equal to or higher than the mould temperature.

14. The process of claim 13, wherein said external release agent is comprised of a wax dispersed in water or in an organic solvent.

15. The process of claim 1, wherein said catalyst component is said organolead and/or organobismuth catalyst, in combination with 0.2 to 1% by weight, based on the weight of components b1, b2, b3, of said organotin catalyst and/or in combination with 0.1 to 1% by weight, based on weight of components b1, b2 and b3, of said diazobicyclo-alkene catalyst.

16. The process of claim 15, wherein said catalyst component is said organolead catalyst in combination with said diazobicyclo-alkene catalyst and with said organotin catalyst, or is said organobismuth catalyst in combination with said organotin catalyst.

17. The process of claim 1, wherein the isocyante component A comprises further up to 10% by weight of prepolymer, with terminal isocyanate groups, of IPDI with isocyanate-reactive compounds containing 2 to 4 isocyanate-reactive hydrogen containing groups.

18. The process of claim 1, wherein said amine-initiator is selected from the following different amine-initiators:
   I. alkanolamine crosslinkers with one secondary NH group and two OH groups;
   II. extenders with one primary $NH_2$ group and one primary OH group located on vicinal carbon atoms;
   III. extenders with one secondary NH group and one primary OH group;
   IV. extenders with two primary $NH_2$ groups, at least one of which is attached to an alicyclic ring; and
   V. extenders with two secondary NH groups, having a branched alkyl or cycloalkyl group with at least four C atoms attached thereto, or crosslinkers with three secondary NH groups, at least two of which having a branched alkyl or cycloalkyl group with at least four C atoms attached thereto.

19. The process of claim 18, wherein said diethanolamine is present in combination with an extender amine-initiator, to achieve an average functionality of between 2 and 3.

20. The process of claim 1, wherein said antioxidant/UV absorber component comprises:
   0.1 to 1% by weight, based on the weight of the reaction mixture, of a substituted phenol primary antioxidant;
   0.1 to 1% by weight, based on the weight of the reaction mixture, of HALS substituted alicyclic amines;
   0 to 5% weight, based on the weight of the reaction mixture, of peroxide decomposers; and
   0.1 to 1% by weight, based on the weight of the reaction mixture of a UV absorber.

21. The process of claim 1, wherein said polyurethane moulding is applied as a flexible or semi-flexible gasket around the periphery of a window by placing the window with its periphery in a mould, closing the mould, and injecting the polyurethane reaction mixture in the closed mould.

22. A micro or non-cellular light-stable elastomeric, flexible or semi-flexible polyurethane moulding having a density of at least 900 kg/m$^3$ and a flexural modulus according to ASTM D790 of between 5 to 300 MPa, which is obtained by reacting according to a reaction injection moulding process.
   A) an isocyanate component comprising an isophorone diisocyanate (IPDI) trimer/monomer mixture having an NCO content of from 24.5 to 34% by weight,
with
   B) isocyanate-reactive components comprising
      b1) a polyol component comprising a polyetherpolyol having terminal OH groups, an average nominal functionality of from 2 to 4, and an average equivalent weight of from 800 to 4000;
      b2) from about 3 to about 20% by weight, based on the weight of components b1, b2 and b3, of at least one chain extender component having as functional groups only aliphatic or alicyclic OH groups, a functionality of 2, an equivalent weight of up to 80, and a primary OH content of at least 50%;
      b3) from about 2 to about 10% by weight, based on the weight of components b1, b2 and b3, of at least one amine-initiator component forming a catalytic system with component C and having from 2 to 3 functional aliphatic NH, $NH_2$ or OH groups, at least one of which is a secondary or primary amino group, and an equivalent weight of up to 150, component b3 including at least 1% by weight of diethanolamine (DEOA), based on the weight of components b1, b2 and b3;
in the presence of
   C) at least one catalyst component selected from the group consisting of organolead (II), organobismuth (III), and organotin (IV) catalyst, the maximum amount of each of these catalysts being respectively for the organolead catalyst 1.5% by weight, the organobismuth catalyst 1.5% by weight and for the oganotin catalyst 3% by weight, based on the weight of components b1, b2 and b3, the organotin catalyst being used either in combination with the oranolead and/or the organobismuth catalyst, and/or in combination with a diazobicyclo-alkene catalyst and/or a salt of this latter catalyst with a weak acid;
   D) at least one pigment component, and
   E) at least one antioxidant/UV absorber component;
   wherein said components are processed via a two-component solvent-free polurethane reaction injection moulding process at an iscoyanate index of 90 to 120, in a closed mould preheated to a temperature of 80 to 130° C., wherein the reaction mixture is injected at a temperature of between 30 and 80° C. the polyurethane reaction mixture, being composed to enable a demoulding time of less than 60 seconds, is substantially free of physical blowing agents and containing up to 0.15% by weight, based on the total weight of the reaction mixture, of water.

23. The polyurethane moulding of claim 22, which has a water absorption less than 10% by weight water uptake, after immersion of a PU sample having a thickness of about 3 mm in water at 2° C. during 72 hours.

24. The process according to claim 1, wherein the isophorone diisocyanate (IPDI) trimer/monomer mixture has an NCO content of from 26 to 32% by weight.

25. The process according to claim 1, wherein the isocyanate-reactive component b3) is employed in an amount of from about 2.5 to about 6 weight, based on the weight of components b1, b2 and b3.

26. The process according to claim 1, wherein said isocyanate index is 95 to 110.

27. The process according to claim 1, wherein the mould is preheated to a temperature of from 95 to 110° C.

28. The process according to claim 1, wherein an external release agent is applied on the mould before injecting the reaction mixture, the release agent having a melting point which is 0 to 30° C. higher than the mould temperature.

29. The process according to claim 19, wherein the extender amine-initiator is monoethanolamine (MEOA).

30. The polyurethane moulding according to claim 22, which has a water absorption of less than 3% by weight water uptake, after immersion of a PU sample having a thickness of about 3 mm in water at 2% during 72 hours.

31. The polyurethane moulding according to claim 22, wherein the moulding is in the form of a window encapsulation gasket.

* * * * *